United States Patent [19]
Gray

[11] 4,039,075
[45] Aug. 2, 1977

[54] METHOD AND APPARATUS FOR LINEARLY CONVEYING WHEELED VEHICLES

[76] Inventor: James Harrel Gray, 3411 East Gold Dust Ave., Phoenix, Ariz. 85028

[21] Appl. No.: 576,169

[22] Filed: May 9, 1975

[51] Int. Cl.² ............................................ B65G 25/04
[52] U.S. Cl. .................................... 198/746; 104/162; 104/172 B; 134/45; 134/123; 214/16.1 DC
[58] Field of Search .............. 198/221, 222, 218, 219, 198/224, 737, 746; 214/16.1 DC; 104/172 B, 162; 134/45, 123

[56] References Cited
U.S. PATENT DOCUMENTS

| | | | |
|---|---|---|---|
| 122,750 | 1/1872 | Whitney | 198/223 |
| 1,048,388 | 12/1912 | Bracken | 198/221 |
| 3,486,609 | 12/1969 | Rogers | 198/772 |

FOREIGN PATENT DOCUMENTS

| | | | |
|---|---|---|---|
| 699,303 | 12/1964 | Canada | 214/16.1 DC |
| 1,051,767 | 3/1959 | Germany | 198/221 |

Primary Examiner—Evon C. Blunk
Assistant Examiner—Douglas D. Watts
Attorney, Agent, or Firm—Cahill, Sutton & Thomas

[57] ABSTRACT

A method and an apparatus for linearly conveying wheeled vehicles are disclosed wherein at least one wheel of the vehicle is supported by a plate which reciprocates longitudinally through a forward stroke and a reverse stroke. The supported wheel is engaged and blocked to prevent its rotation during the forward stroke, thereby pushing the wheel, and thus the vehicle, to a forward position with the plate. During the reverse stroke, the wheel is free to rotate, permitting the plate to return to its rearmost position while the wheel remains at the forward position. During subsequent forward strokes, the wheel is similarly engaged and blocked and the vehicle is sequentially advanced the length of the forward stroke during each reciprocation of the plate.

16 Claims, 28 Drawing Figures fig.1 fig.2 fig.3 fig. 6 fig. 7a fig. 7b fig. 8a fig. 8b fig. 9a fig 9b

METHOD AND APPARATUS FOR LINEARLY CONVEYING WHEELED VEHICLES

FIELD OF THE INVENTION

This invention relates to conveyor systems, and, more particularly, to methods and apparatus for conveying wheeled vehicles.

DESCRIPTION OF THE PRIOR ART

The modern automatic car wash installation is a linear arrangement of complex and expensive equipment necessary to perform various cleansing functions: water jets for wetting down and rinsing the motor vehicle being washed, soap applicators, complicated scrubbing brushes mounted on articulated arms, wheel and tire cleaning brushes, wax applicators, friction curtains, water stripper and dryers. These are all laid out along a path to perform sequential operations on the vehicle. The vehicle is moved through the wetting, scrubbing, cleaning, waxing and drying operations by a conveyor system. The most common of these conveyor systems presently in use includes a long, continuous chain which is driven by a massive gear and sprocket system. The chain carries a series of spaced rollers which engage a front wheel of the vehicle, moving the vehicle at a predetermined speed along a path through the various apparatus performing the sequential operations previously described. In order to insure that the vehicle will follow the desired path, guide rails are frequently included to prevent the wheels of the vehicle from deviating from that path.

In such chain drive systems as disclosed in U.S. Pat. No. 3,233,557 for example, the long chain must be kept under substantial tension. The massive gears and sprockets of the drive system, the long chain, the idler wheels supporting the chain, and the rollers for engaging the vehicles' wheels all create substantial friction. In addition, such systems functionally deteriorate with prolonged exposure to the corrosive environment of the typical car wash installation due to the inevitable buildup of rust, wax, soap, sludge and other waste products. Thus, the inherent friction in the mechanism of the conveyor system, and the built-up deposits which produce drag, create a substantial power loss which must be overcome without regard to the power actually required to move the vehicles themselves.

It is therefore an object of my invention to produce a more energy efficient conveyor system by eliminating many drag and friction sources, such as chains, rollers, gears, sprockets, idlers and the like.

Other types of conveyors, such as the one disclosed in U.S. Pat. No. 3,838,769, advance an object by lifting it above the floor or reference plane. The conveyor utilizes a rectilinear motion to advance a tobacco-filled hogshead by lifting the hogshead above the floor, advancing it, lowering it to the floor, and then dropping beneath and out of contact with the hogshead and returning to its initial position. A substantial energy loss is associated with the repeated lifting of the object being conveyed.

Another object of my invention in its preferred embodiment is to substantially eliminate energy dissipated in lifting an object being conveyed by supporting the object in the plane along which the object is advanced.

Prior art chain drive conveyor systems of the type referred to above are mechanically complex and contain a substantial number of moving parts. During normal operation many parts of the system are subjected to extreme mechanical stress. As a result, not only are such systems expensive to manufacture and assemble, but also their very design results in a substantial amount of down time, i.e., time during which the entire car wash system is inoperative or commercially unusable. Conveyor down time is scheduled regularly, both for lubricating the contacting parts to avoid abnormal wear and also for adjusting the parts to compensate for the normal wear resulting from the extreme mechanical stresses. Down time also results unexpectedly due to broken and damaged parts which must be repaired or replaced. Down time can cost a busy car wash several hundred dollars per hour in lost business. Losses can be reduced by scheduling routine maintenance during off-peak hours, or when the car wash is closed. However, unexpected failures can occur at any time and must be repaired when they occur, not when repairs are convenient or economical.

It is also an object of my invention to substantially reduce the cost of manufacturing a conveyor system by simplifying the mechanical parts in the system and reducing their number.

It is another object of my invention to substantially reduce the down time required for maintenance and repair and to reduce operating costs both by eliminating mechanical stress and by reducing the number of parts subject to failure.

Because tension must be maintained in the drive chain of prior art systems, it is necessary to make frequent adjustments to compensate for wear and fatigue of parts in the drive train of the conveyor system. This increases the maintenance required and the expense of down time of the conveyor system.

It is also an objective of my invention to eliminate the necessity for adjustments to compensate for wear, and to thereby avoid resultant expense by eliminating parts whose wear affects the operation of the conveyor system.

Any subsurface conveyor system, such as the conventional chain drive system previously discussed, requires the construction of a deep concrete pit to house the power and drive units and to provide a return path for the drive chain. The deep pit requires extensive excavation and site preparation prior to installation of the conveyor equipment. In addition, construction of the concrete housing requires large quantities of concrete and elaborate pouring forms. These deep concrete pits represent an expensive portion of any car wash installation. Once the conveyor is installed, the deep pit makes access to the conveyor difficult and expensive for maintenance and repair purposes and produces a deep sump into which runoff water, soap and dirt tend to collect.

Another objective of my invention is to substantially reduce the depth of the subsurface housing required for the conveyor system.

Various attempts have been made to reduce the depth of the subsurface housing. For example, in U.S. Pat. No. 3,382,953, a conveyor for wheeled vehicles is disclosed which eliminates the chain drive and resulting deep subsurface housing by utilizing a long stroke hydraulic cylinder. During the forward stroke of the cylinder, a roller is forced into engagement with a wheel of the vehicle, thereby moving the vehicle through the equipment stationed along the car wash path. At the end of the path, the roller pivots to the side, so that on the return stroke of the hydraulic cylinder the roller will not contact any other wheel of the vehicle. The long stroke of the hydraulic cylinder of such a conveyor makes the cylinder necessarily bulky and prone to alignment problems. The unavoidable accumulation of dirt, soap, wax and rust on the cylinder rod suggests substantial maintenance difficulty. Further, the long stroke cylinder is applicable to moving only a single vehicle at a time through the washing installation rather than a continuous series of closely spaced vehicles.

A further object of my invention is to avoid the necessity for a long stroke hydraulic cylinder by conveying a vehicle through the use of a short stroke cylinder.

Still a further object of my invention is to permit the simultaneous conveyance of a plurality of closely spaced vehicles.

Conventional conveyor systems, particularly the chain drive systems, represent a significant hazard to personnel. Because of the nature of the conveyor system, it is virtually impossible to shield personnel from moving parts of the conveyor system. Serious injuries are frequently reported by those whose hands, feet and clothing have been caught in the conveyor mechanism. A particular danger exists at the transition points where operators, dryers and detail cleaners are most frequently present. The rollers associated with most prior art conveyor systems pass under overhanging supports or shields upon entering or leaving the transition points. The shearing action produced may severely injure persons coming in contact with the mechanism. Again, it is extremely difficult to properly shield these danger points from potential contact.

Chain drive systems are susceptible to jamming and accordingly, a second potential source of personnel injury exists. Attempts to free a "hung up" drive chain or roller can result in hands or feet being caught between the sprocket and chain when the released chain or roller suddenly moves or when power is unknowingly applied to the drive system. Because of the high incidence of serious injury to employees of car wash installations, the premiums on mandatory workman's compensation and liability insurance are relatively high.

It is therefore an additional object of my invention to substantially reduce the danger to persons working in the vicinity of the conveyor system by providing a conveyor structure which is capable of being effectively shielded.

Typically, prior art conveyor systems apply a motive force to only a single wheel of a vehicle. Because of this, the vehicle has a tendency to track transversely to the direction of travel as the vehicle moves through the car wash installation. Guide rails are normally provided to prevent this transverse movement. The guide rails also serve to straighten the wheels of the vehicle to reduce the drag resulting from a vehicle being conveyed through a car wash installation with its front wheels at an angle to the direction of travel.

Forward movement of a vehicle on prior art conveyor systems creates a transverse force between the guide rails and the wheels of the vehicle. The transverse force results from the tendency of the vehicle to track transversely and from wheels being angled to the direction of travel. Conventional conveyor systems cause all vehicle wheels to rotate in a forward direction as the vehicle is advanced. This forward rotation combines with the transverse force to create a tendency for the vehicle wheels to "climb out" of their intended path by riding up and over the guide rails. The resulting collision between the vehicle and the adjacent car wash equipment often results in considerable damage, both to the vehicle and to the equipment. Although climb out has always represented a rather difficult practical problem, the widespread use of radial ply tires has exaggerated the problem. The extreme sidewall flexibility of radial tires allows them to climb out with the application of very little transverse force.

Damage to a customer's vehicle gives rise to a public relations problem that even compensation cannot always resolve. Potentially even more costly to the installation owner is the possibility that damage to the car wash equipment may prevent its operation until repaired. Even it repairs take only a few hours (although several days may be required to obtain replacement parts), the car wash installation is closed down completely and is producing no income whatsoever.

Thus, another objective of my invention is to prevent vehicle wheels from climbing out of their intended path and rolling over the guide rails by eliminating the forward rotation of the driven wheel as the vehicle is advanced by the conveyor system.

Prior art conveyor systems are also susceptible to damage if the vehicle brakes are applied while the vehicle is on the conveyor, or if the vehicle exits the conveyor early by being driven prematurely off the conveyor system. Because many car wash installations operate with the customer in the vehicle, the possibility always exists that the customer will apply the brakes either inadvertently or mischievously or that the vehicle will be driven forward while still on the conveyor system. If the vehicle brakes are applied, the vehicle stops or slows while the conveyor continues to move forward. This relative motion between the vehicle and the conveyor may shear the pin which supports the roller, or break the drive chain, or damage the gear and sprocket of the drive train. Similarly, severe mechanical stress to the conveyor results when the vehicle is driven forward. Thus, an inoperative conveyor renders an otherwise operative car wash commercially unusable since substantial damage could result if vehicles were driven through to utilize the operative car wash equipment.

One object of my invention is to diminish the possibility of damage to the conveyor system resulting from the braking or acceleration of a vehicle on the conveyor.

Another object of my invention is to permit a vehicle to be driven through a car wash installation without damaging the conveyor system.

Due to the susceptibility of conventional conveyor systems to damage when a vehicle is moved relative to the conveyor system, either separate equipment is required or great care must be exercised in moving a vehicle onto the conveyor.

An additional objective of my invention is to allow a vehicle to freely enter the conveyor system at any time and at any reasonable forward speed.

The spacing between drive rollers in the prior art conveyor systems is typically 10–15 feet. As a result, a substantial time lag may occur between the positioning of a vehicle on the conveyor and its forward movement.

Still another object of my invention is to substantially reduce the time lag between the positioning of a vehicle on the conveyor and movement of the vehicle along the conveyor system by providing closely spaced vehicle engaging means.

Due to the relatively wide spacing between the vehicle engaging means on a conventional conveyor systems (e.g., rollers), very little flexibility is provided in positioning vehicles on the conveyor. As a result, unnecessary space may exist between adjacent vehicles moving through the installation. For example, a space large enough to accommodate a 20-foot long limousine may contain only a 10-foot long sports car, yet the spacing cannot be reduced. The most efficient system, permitting the maximum number of cars to be conveyed through the installation in a given time, is a system where spacing between vehicles is relatively close and uniform regardless of the length of the vehicle. This spacing cannot be obtained from the conventional conveyor system having individually spaced vehicle engaging means.

Another of the objects of my invention is to achieve flexibility in vehicle spacing including uniform spacing where desired between adjacent vehicles on the conveyor regardless of the length of the vehicles.

Occasionally, the driven wheel of a vehicle on a prior art conveyor passes over the advancing drive roller. This causes a collision with the following vehicle, resulting in damage to either or both vehicles. To prevent such collisions, a second safety roller can be added to the conveyor behind the drive roller. The safety roller is intended to advance the first vehicle before the collision occurs. However, there is no assurance that the conditions permitting the wheel to pass over the drive roller will not also permit it to pass over the safety roller as well. Further, unless sufficient spacing is left between vehicles, the collision will occur before the wheel is engaged by the safety roller.

It is therefore one more object of my invention to provide a closely spaced series of vehicle engaging means.

Conventional conveyor systems engage a front wheel of a vehicle and advance it a distance substantially equal to the length of the conveyor. Thus, the effective length of the conveyor is equal to the actual length.

An additional objective of my invention is to increase the effective length of a conveyor system substantially beyond its actual length by engaging both the front are rear wheels of a vehicle.

Mechanical interference between gears, sprockets, chains and rollers creates a substantial amount of noise. In some instances, the noise level is sufficient to cause hearing loss in employees who do not wear protective earcovers. The intensity of the noise also creates continuing problems with neighbors who consider it a nuisance.

It is another object of my invention to substantially reduce the noise level produced by the vehicle conveyor system by virtually eliminating contact between moving metal parts and by completely eliminating the gearing, sprockets and drive chain associated with conventional conveyor systems.

The power unit of prior art conveyor systems must be located near one end of the conveyor. In addition, such power units must often be located in large subsurface housings. Although unused space may exist between pieces of equipment along a car wash line, unused space is seldom present at the ends of the line. Rather, the ends of a car wash are frequently congested with equipment and personnel, making end location of the power unit very undesirable.

Still another object of my invention is to allow the power unit to be located anywhere along the length of a conveyor.

For reasons of economy and space utilization, the use of several small power units may be preferably to the use of a single large power unit. The difficulty of synchronizing multiple power inputs has virtually precluded their use in prior art conveyor systems.

A further object of my invention is to utilize, where advantageous, multiple power units acting in concert.

The high inertia and friction of chain and cable driven conveyors require substantially more power to start up the conveyor than to run it. Once started, such conveyors frequently run continuously unless substantial delays are encountered. Because vehicles appear at a car wash intermittently, it would be desirable to stop the conveyor when no vehicle is waiting to be advanced through the car wash. In addition, the power unit must be sized to provide the necessary start-up power enve if that substantially exceeds the running power requirements.

It is therefore a further object of my invention to make intermittent operation of a conveyor system economically feasible by reducing inertia and start-up friction.

Because my invention represents such an advance over the prior art, and such a departure from conventional systems, it is perhaps advantageous to compare my invention with certain non-analogous prior art which has apparently never been applied to the car wash or vehicle conveyor art. Examples of such prior art conveyor systems are disclosed in the following U.S. Pat. Nos.:

787,696 issued Apr. 18, 1905 to C. Redd
1,219,900 issued Mar. 20, 1917 to J. A. Alvey
1,756,584 issued Apr. 29, 1930 to F. T. Cope
2,961,973 issued Nov. 29, 1960 to W. B. Bozman
3,486,609 issued Dec. 30, 1969 to H. T. Rogers
3,729,086 issued Apr. 24, 1973 to M. N. Phillips, et al.
3,825,109 issued July 23, 1974 to J. M. Stockbridge
3,827,549 issued Aug. 6, 1974 to W. H. Hunter

SUMMARY OF THE INVENTION

Briefly stated, and in accordance with one embodiment of my invention, a wheel of the vehicle to be conveyed is supported by a plate which reciprocates along the line of the vehicle advancement. As the reciprocating plate moves forward, the supported wheel is blocked to prevent its rotation and thus moves forward with the plate. When the plate moves in a rearward direction, the supported wheel is allowed to rotate while being maintained at its forward position. Thus, each time the plate reciprocates, the supported wheel, and hence the vehicle, is advanced by approximately the distance through which the plate reciprocates.

My invention may be embodied in an apparatus which includes a reciprocating plate for supporting a wheel of the vehicle to be advanced. The reciprocating plate includes a series of closely spaced, rotatable pawls which are uniformly distributed along the length of the plate. Each pawl is mounted to allow rotation in a forward direction, but not in a rearward direction. The pawls are carried forward by the plate during its forward stroke. One pawl is thereby moved into engagement with the rear edge of the supported wheel. Prevented from rotating rearward, the engaging pawl blocks the rotation of the wheel, thus carrying the wheel forward with the plate. During the rearward stroke of the plate, the wheel remains in its forward position and the pawls rotate downward and out of engagement with the wheel.

DESCRIPTION OF THE DRAWINGS

The invention is pointed out with particularity in the appended claims. However, other objects and advantages, together with the method and operation of the invention may be better understood by reference to the following detailed description taken in conjunction with the following drawings wherein:

DETAILED DESCRIPTION OF THE ILLUSTRATIVE EMBODIMENT

Figure 1:
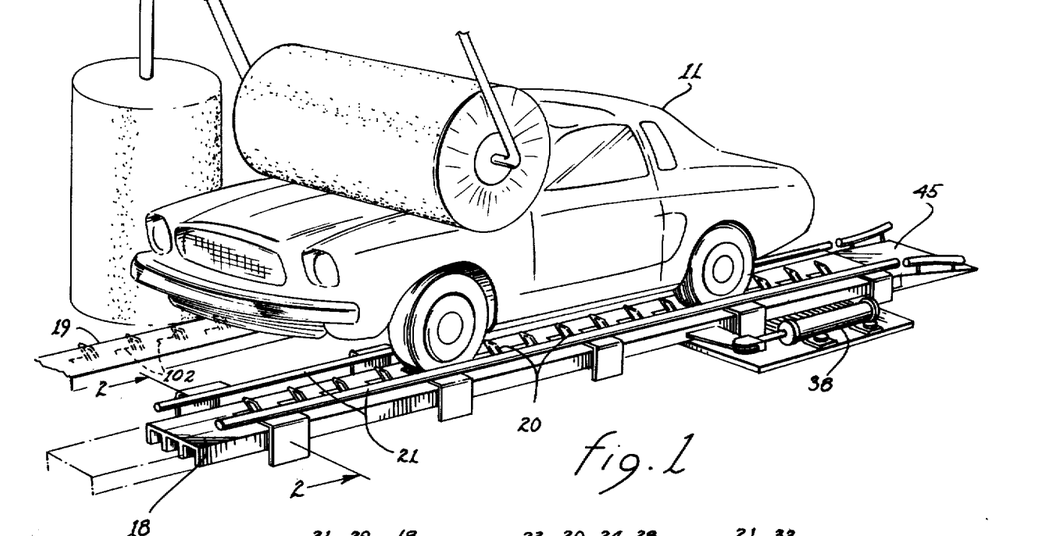
FIG. 1 is a perspective view of a conveyor system in accordance with my invention.

A conveyor in accordance with my invention is shown in the perspective view in FIG. 1 transporting a vehicle 11 through a car wash line. The left side of vehicle 11 is supported by a stationary plate 19. Integral to reciprocating plate 18 is a series of movable pawls 20. Each movable pawl 20 is interchangeable with every other pawl in the series. Adjacent to reciprocating plate 18 are a pair of guide rails 21 which are fixed in position. The power to reciprocate plate 18 is supplied by a power cylinder 38 located toward the rear of plate 18.

Figure 2:
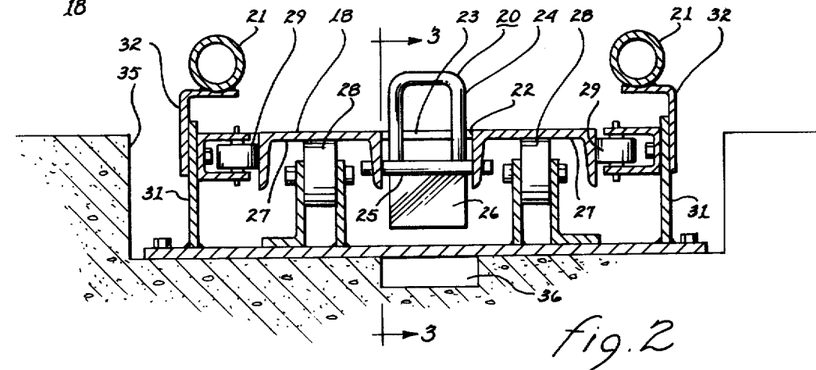
FIG. 2 is a cross-sectional view taken along the line 2—2 shown in FIG. 1.
Figure 3:
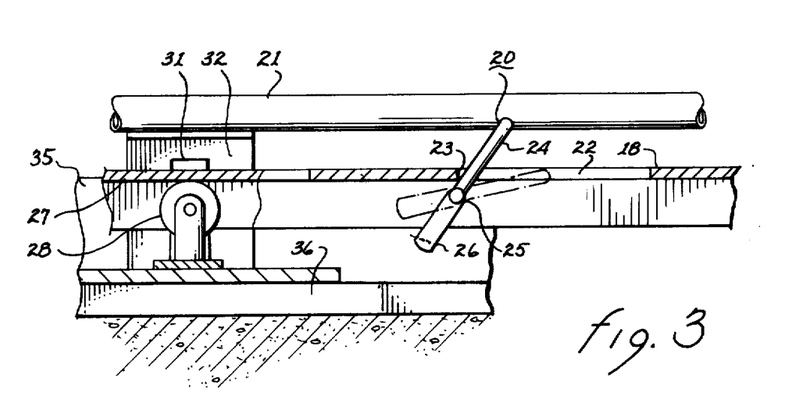
FIG. 3 is a cross-sectional view taken along the line 3—3 shown in FIG. 2.

The cross-sectional views, FIGS. 2 and 3, illustrate the mechanisms for supporting reciprocating plate 18 and the plurality of movable pawls 20. Reciprocating plate 18 and its associated hardware are located in a mounting indentation 35 which is a nominal depth depression in a concrete pad which constitutes the base of the car wash line. Down the center of mounting indentation 35 is a drainage channel 36 positioned below all of the apparatus comprising plate 18 and its related hardware. Channel 36 carries drain water, with its entrained soap, dirt and other residue, away from the conveyor apparatus.

FIG. 2 shows that each pawl 20 is mounted within an excess slot 22 located in the upper surface of plate 18 and includes a vehicle engaging loop 24 supported by a pivot pin 25 and counterbalanced by a counterweight 26. The opening in plate 18 provided by slot 22 is also effective to permit dirt and other residue to fall through the plate and into channel 36, thereby preventing accumlations which could interfere with the operation of pawls 20. Plate 18 is supported by a plurality of support rollers 28 which fit into a pair of parallel roller channels 27. Side rollers 29 contact the sides of plate 18 to provide lateral stability. Side rollers 29 are mounted on guide brackets 31 which also support guide rail supports 32 and properly position guide rails 21 above the top surface of plate 18.

As best seen in FIG. 3, pawl 20 is free to rotate about pivot 25. Counterweight 26 normally acts to hold pawl 20 in the fully upright position shown in solid outline. Rear edge 23 of access slot 23 contacts engaging loop 24 to limit the counterclockwise rotation of pawl 20 at that point. Pawl 20 can be rotated in a clockwise direction, as shown in dotted outline, to bring engaging loop 24 flush with, or below, the upper surface of plate 18. The solid and dotted positions of pawl 20 are referred to as the upright position and the retracted position, respectively.

OPERATION OF THE CONVEYOR

A series of stylized schematic figures, FIGS. 4a through 4h, show the sequential progression of one wheel of a vehicle along a conveyor in accordance with my invention. In these figures, a vehicle enters the conveyor on the left side and exits on the right side. To enter the conveyor system, a vehicle is driven onto plate 18 so that at least one wheel of the vehicle, for example, left front wheel 12, moves from the entry plate 45 onto plate 18 to a position where wheel 12 can be engaged by the series of pawls 20. With wheel 12 properly positioned on the conveyor, the forward motion (movement from left to right) of plate 18 will cause one of the pawls 20 to engage the rear portion of the circumference of wheel 12. For example, in FIG. 4a, wheel 12 is about to be engaged by pawl 20a.

Figure 4A:
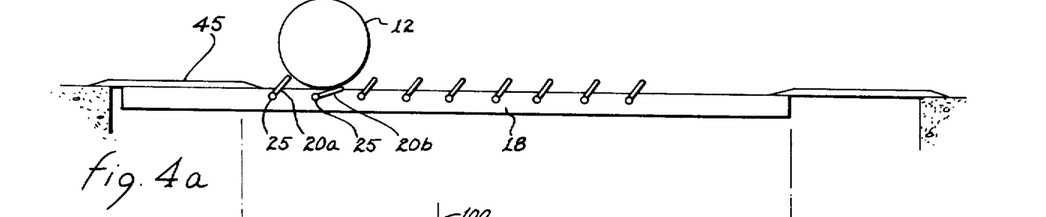
FIGS. 4a through 4h are a series of schematic drawings showing a wheel of a vehicle being advanced by the conveyor system shown in FIG. 1 and illustrating the basic method of my invention.
Figure 4B:
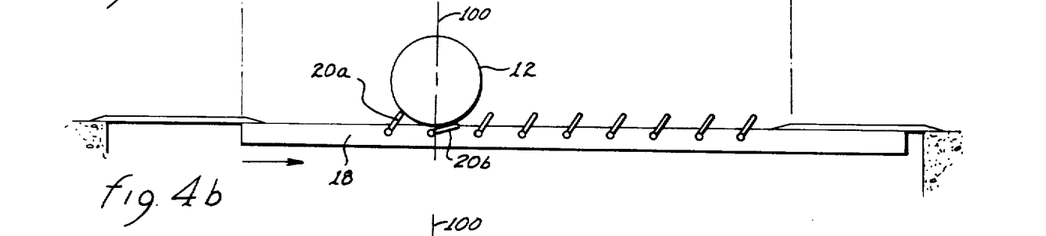
Figures 4C, 4D, 4E:
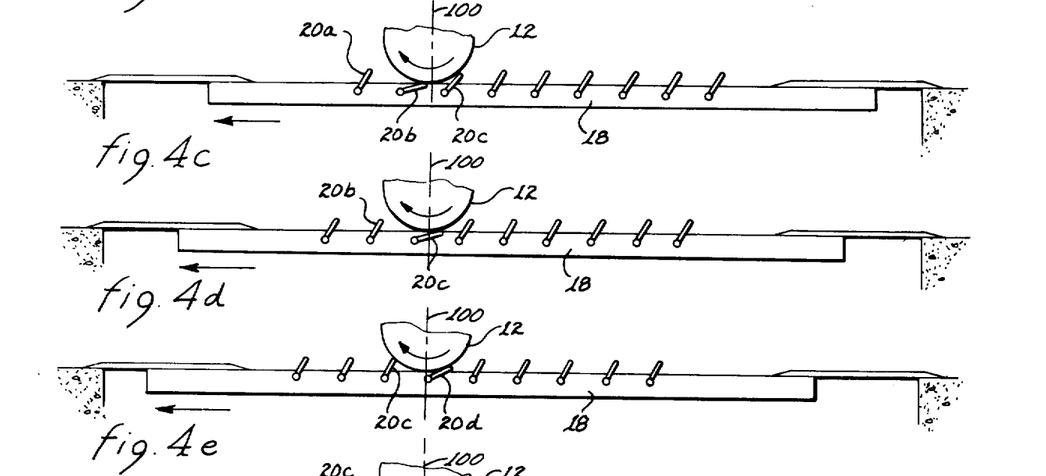

As plate 18 advances from left to right pawl 20a in FIG. 4a engages the rear circumference of wheel 12 and blocks the wheel to prevent its rotation. As a result, the forward movement of plate 18 advances wheel 12 to the position shown in FIG. 4b. As plate 18 begins its rearward movement, shown progressively in FIGS. 4c through 4f wheel 12 remains in the position to which it was advanced by the first forward reciprocation illustrated in FIGS. 4a and 4b. As plate 18 moves rearward, pawl 20a no longer contacts wheel 12 and the wheel is free to rotate clockwise, as is shown in FIG. 4c through 4f due to the movement of the plate back to the left. Pawl 20b which is shown retracted in FIG. 4c is freed by the rearward movement of plate 18 and returns to its upright position in FIG. 4d due to the effect of its associated counterweight 46. Simultaneously, wheel 12 will force pawl 20c into its retracted position. In FIG. 4e, pawl 20c has been freed to return to its upright position while pawl 20d has already been partially retracted. This sequence of events occurs since plate 18 is moving to the left while wheel 12 maintains its advanced position due to its inertia. The tangential force applied to the circumference of wheel 12 by the leftward moving plate 18 causes wheel 12 to rotate, but not to move to the left or right. Dotted line 100 illustrates that the position of wheel 12 has not changed as a result of the leftward motion of plate 18 as is shown in FIGS. 4c through 4f.

Figures 4F, 4G, 4H:
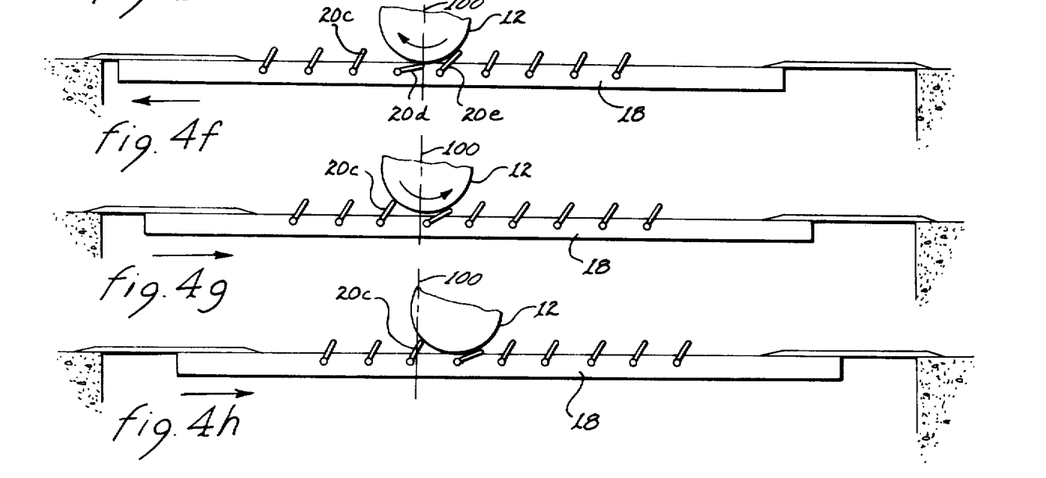

At the full rearward positon of plate 18, shown in FIG. 4f, it will be noted that pawl 20c is in the upright position although a gap exists between pawl 20c and wheel 12. Pawl 20d is held in its fully retracted position while pawl 20e is partially retracted. As plate 18 moves forward, wheel 12 will rotate a few degrees in a counterclockwise direction but will not be advanced from left to right until the plate 18 reaches the position shown in FIG. 4g. The gap between pawl 20c and wheel 12 has now closed and the pawl 20c blocks the wheel, preventing its rotation and causing it to advance with the plate, as shown in FIG. 4h.

Figures 5A, 5B:
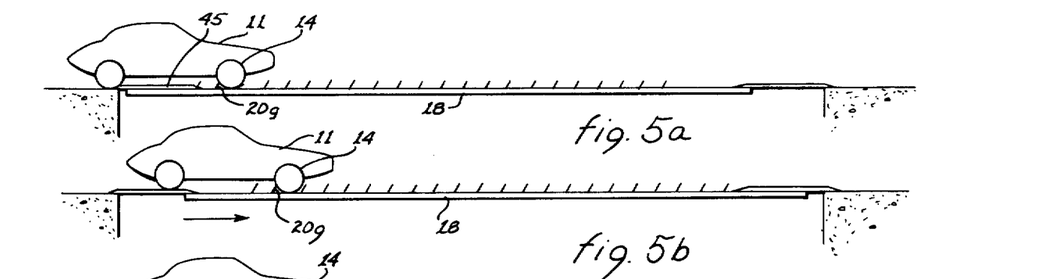
FIGS. 5a through 5j consist of a series of schematic drawings showing a vehicle proceeding along the conveyor from the entrance point to the exit point and further illustrating the various stages in my new method for conveying wheeled vehicles.

FIGS. 4a through 4h depict the advancement sequence for a single wheel. A similar depiction of the advancement of a vehicle 11 is shown in FIGS. 5a through 5j, wherein plate 18 is shown alternately in its full rearward and full forward positions, respectively. In FIG. 5a, vehicle 11 has already been driven onto plate 18 so that right front wheel 14 has left entry plate 45 and reached a point where pawl 20g will engage it. It should be noted at this point that FIGS. 5a through 5j show vehicle 11 being advanced by a reciprocating plate 18 located beneath the right set of wheels of the vehicle, as opposed to the left side position shown in FIG. 1. Vehicle 11 can be advanced with equal facility by engaging the wheels of either the left or right side, or, as will be explained later in more detail, the wheels of both sides of the vehicle may be so advanced.

The forward movement of plate 18 carries wheel 14, and thereby vehicle 11, to the position shown in FIG. 5b. In moving rearward, to the position shown in FIG. 5c, wheel 14 causes pawls 20h and 20i to retract and then release, and retracts pawl 20j. When plate 18 moves forward, pawl 20i engages wheel 14, carrying vehicle 11 forward to the position shown in FIG. 5d and causing wheel 15 of the vehicle to advance from entry plate 45 onto plate 18.

Figures 5C, 5D, 5E, 5F:
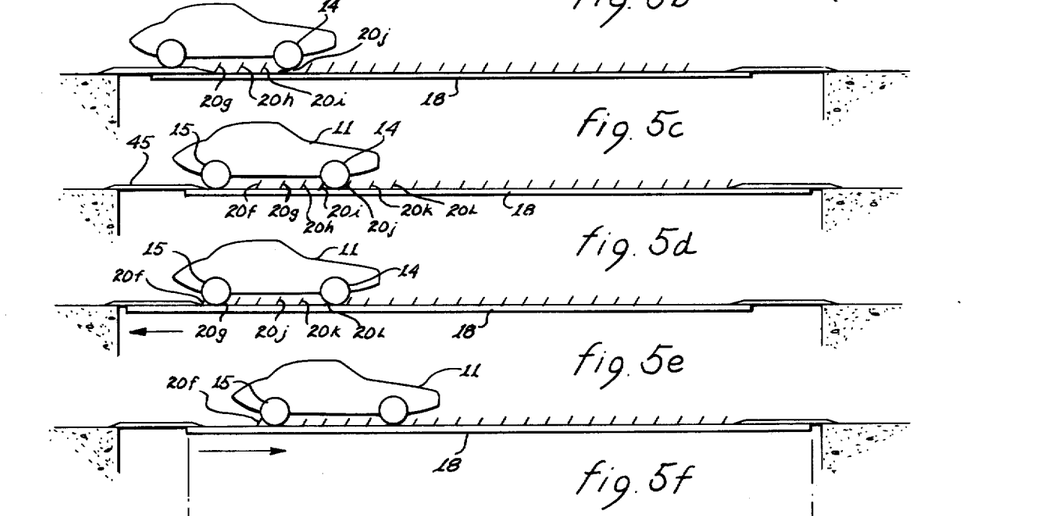

While plate 18 is moving rearward to its position in FIG. 5e, wheel 14 rotates and releases pawls 20j and 20k and rotates pawl 20l. Concurrently, wheel 15 retracts and releases pawl 20f and retracts pawl 20g. Because the gap between pawl 20f and wheel 15 is less than the gap between pawl 20k and wheel 14, wheel 15 alone, and not wheel 14 will be blocked to prevent its rotation. This blocking of a single wheel may occur when the wheel base of the vehicle 11 and the spacing between the pawls 20 are not matched. Normally both wheels will be blocked since typically the pawls 20 are closely spaced and the rubber tread on tires yields when engaged by the pawls. As plate 18 moves to the position shown in FIG. 5f, which represents the advance of vehicle 11 after three forward reciprocations of the plate, both of the non-rotating wheels 14 and 15 will be carried forward with the plate.

Figures 5G, 5H, 5I, 5J:
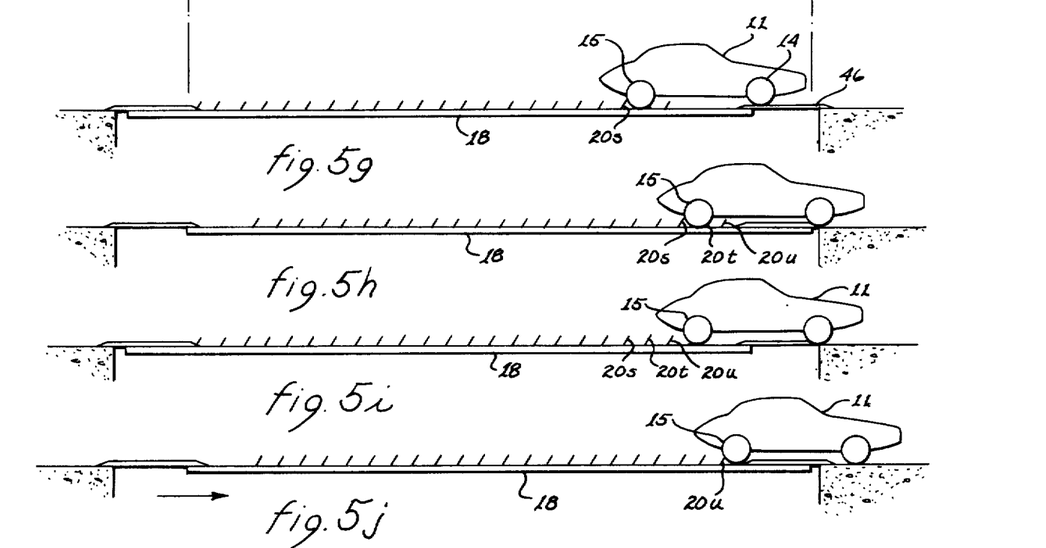

Plate 18 continues to advance vehicle 11 until front wheel 14 leaves the plate and advances onto exit plate 46 as shown in FIG. 5g. During the reciprocations of plate 18 that advanced vehicle 11 from its position in FIG. 5f to its position in FIG. 5g, either or both wheels are randomly blocked by a pawl 20. It is inconsequential which wheel is blocked when both wheels are on plate 18. The blocking of either wheel will produce the advance of vehicle 11 with plate 18 and this blocking of either or both wheels precludes rotation of either wheel with respect to plate 18. With wheel 14 has advanced beyond plate 18, only wheel 15 will be blocked by pawls 20.

Pawl 20s blocks wheel 15 causing vehicle 11 to advance to the position shown in FIG. 5h. As plate 18 moves rearward to the position shown in FIG. 5i, pawl 20s no longer engages wheel 15 and the wheel rotates and releases pawls 20t and 20u. When plate 18 advances again, pawl 20u engages wheel 15 and advances vehicle 11 to the limit of its advance by the conveyor system. It should be noted that the distance vehicle 11 has been advanced exceeds the length of the conveyor system by a distance approximating the wheelbase of vehicle 11. Thus, the effective length of the conveyor system substantially exceeds its actual length.

It is advantageous to have the rearward stroke of reciprocating plate 18 significantly more rapid than the forward stroke of the plate. In this way the rolling inertia of vehicle 11 is preserved since the impetus provided by a subsequently engaged pawl will be applied to wheel of the vehicle before the vehicle loses all of its forward momentum. This will reduce the energy required, as will supporting plate 18 on rollers as shown in FIGS. 2 and 3.

The blocking of a wheel by one of the pawls causes the wheel to advance with plate 18, and also prevents the wheel from climbing out of the guide rails 21. Since the wheels of vehicle 11 on plate 18 cannot rotate as the plate moves to convey the vehicle forward, it is impossible for the wheel to roll up and over the guide rail. The lateral pressure applied to the wheel by guide rails 21 will be effective to maintain the wheel in a straight ahead orientation while preventing climb-out and associated damage to the vehicle and car wash apparatus.

Because the pawls 20 are free to rotate in a forward direction, no damage will result from driving a vehicle forward while on plate 18. This both faciliates the initial placement of a vehicle on plate 8 and prevents inadvertent damage to the conveyor system should a vehicle advance relative to the conveyor. Also, if the brakes of vehicle 11 should be applied while the vehicle is supported by plate 18, no damage to the conveyor results. The braking of vehicle 11 impedes the movement of plate 18, overloading power cylinder 38. A threshold sensor (not shown) detects the overload and bypasses the power input to prevent damage to cylinder 38. The advance of all vehicles on the conveyor is interrupted, precluding a collision between vehicles. As soon as the brakes on vehicle 11 are released, the conveyor resumes advancing all vehicles located on plate 18, thereby avoiding damage to any of the vehicles, to power cylinder 38 or any of the expensive peripheral equipment of the car wash line.

With the spacing between adjacent pawls being relatively small, it can be appreciated that a vehicle following vehicle 11 could be positioned at almost any desired spacing from the rear bumper of vehicle 11. It is thereby possible to obtain a maximum number of vehicles transported by plate 18 in a given amount of time. Also, as a result of the relatively close spacing between adjacent pawls, in the unlikely event that a pawl is not properly positioned against the wheel of a vehicle being advanced by plate 18, allowing the wheel of the vehicle to jump the engaging pawl, or if the pawl is inoperative, the following pawl will immediately contact the wheel and move the vehicle forward. This close placement of relatively inexpensive drive elements precludes collision between adjacent vehicles on the drive line.

Although the noise level of a reciprocating plate apparatus in accordance with my invention is substantially less than that of a chain driven or cable driven apparatus, the noise level of an apparatus embodying my invention can be reduced even further by supporting pivots 25 in plastic bushings and by installing a resilient material along the rear edge 23 of access slot 22. The resilient material reduces the noise otherwise generated when a pawl 20 returns to its full upright position. As virtually every other moving part of the conveyor system is supported by rollers, the noise level generated by movement of plate 18 is at a very low level. Other noise suppression techniques for use with this simple structure will be obvious to those of ordinary skill in the art.

The motion between plate 18 and entry plate 45 and between plate 18 and exit plate 46 is analogous to the movable steps and fixed plates of an escalator. Although relative movement occurs, the gap between the moving parts is insufficient to permit insertion of sizeable objects. Since the forward and rearward edges of plate 18 are respectively covered by entry plate 45 and exit plate 46, it will be appreciated that moving parts capable of catching clothing or personnel have been virtually eliminated. The only pawls that move on conveyor 18 are those immediately beneath a wheel of the vehicle, making it necessary for a person to place a hand or foot almost beneath the wheel of the vehicle in order to be caught by a moving part of the conveyor apparatus. By appropriately shielding the conveyor, it becomes almost impossible for an individual to be inadvertently injured.

Due to their high inertia and friction, chain and cable driven conveyors require substantially more power to start up than they do to run. Accordingly, once started such systems are often run continuously unless a delay of significant duration is encountered. By contrast, reciprocating plate 18 has very little inertia and requires no significant additional start up power. It is inherent in the motion of plate 18 that it comes to rest twice during each full reciprocation. At the full forward and full rearward positions, plate 18 changes direction and instantaneously comes to a full stop. Since plate 18 is normally stopped and restarted twice per reciprocation, it should be apparent that the reciprocation of the plate 18 can be economically interrupted at any time, even for brief periods, when a delay is encountered or when no vehicle is present to be advanced by the conveyor.

Figure 6:
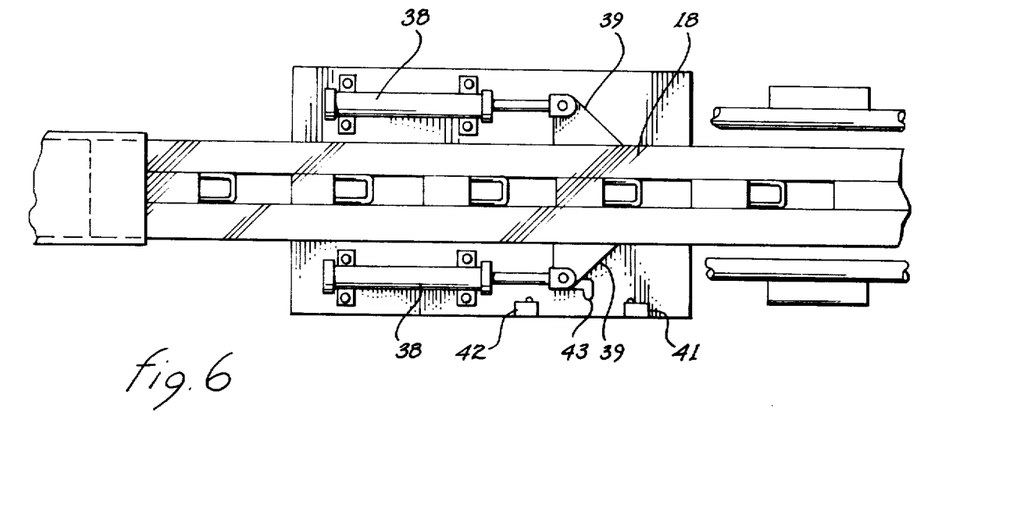
FIG. 6 is a plan view of the power unit of the conveyor system shown in FIG. 1.

Since the entire length of plate 18 reciprocates, power cylinder 38 can be connected to the plate at any convenient point. Thus, power cylinder 38 can be located wherever free space occurs along the conveyor whether intermediate or at either end. Even in those applications where no suitably large free space exists along the entire length of the conveyor, a plurality of small power cylinders can be utilized, in concert and located wherever possible, to provide the power to reciprocate plate 18. For example, FIG. 6 shows a pair of power cylinders located on either side of plate 18. Also, if it is inconvenient to drive the left side of vehicle 11, plates 18 and 19 can be interchanged to provide power to the right side of the vehicle.

Although a variety of power inputs, such as a motor driven eccentric, could be utilized to reciprocate plate 18, a fluid pressure cylinder is preferable. Such a cylinder could be either air or hydraulic powered, with the hydraulic cylinder requiring less input power. Fluid pressure cylinders are readily adjusted by controlling their input pressure. This permits the applied power, and therefore the operating speed, to be varied selectively. The length of stroke of such a cylinder would be unaffected by such speed variations. For example, cylinders 38 in FIG. 6 operate through a stroke length determined by the positions of forward limit switch 41 and rearward limit switch 42 which are contacted at the full forward and full rearward positions, respectively, by finger 43. The stroke length of cylinders 38 can be adjusted by altering the position of switches 41 and 42.

To provide a neater appearance and to safely enclose the moving apparatus, a suitable cover (not shown) is provided to cover cylinders 38 and the reciprocating connecting rods 39 which connect to plate 18. It may be well to point out the advantages of fabricating plate 18 in readily assembled sections rather than a single long plate.

The required length of the conveyor will vary from one installation to another. Fabrication of the conveyor in five or ten foot lengths permits assembly of the conveyor from standard lengths rather than requiring custom fabrication of each conveyor. One or more short power sections, adapted for connection to rods 39, provide the power input to each conveyor. An appropriate number of standard lengths of plate 18 with the assembled parts are then attached to the power section. Since the pawls are passive drive elements, such standardization permits economical manufacture and shipping without affecting performance of the conveyor. Although such an arrangement is not shown, it would be obvious to one skilled in the art to modify plate 18 accordingly.

In those installations where continuous forward motion is required, a plate supporting both the left and right sides of the vehicle can be reciprocated. By operating the pair of plates to reciprocate out of phase with each other, a more continuous forward movement of vehicle 11 could be obtained.

Because tire widths vary over a substantial range, the separation between guide rails 21 may be adjusted by inserting suitable spacers between guide rail supports 32 and guide brackets 31. This permits the conveyor to accommodate very wide tires, truck tires being one example. Also, engaging loop 24 of pawl 20 is readily fabricated from bent rod which eliminates sharp edges on corners. This precludes the possibility of a tire being punctured by the drive apparatus even in an extreme condition, such as applying the vehicle brakes while the wheels are positioned on the conveyor.

Figure 7A:
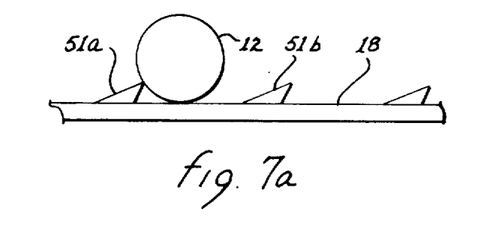
FIGS. 7a and 7b are a schematic representation of a first alternative embodiment of a conveyor in accordance with my invention.
Figure 7B:
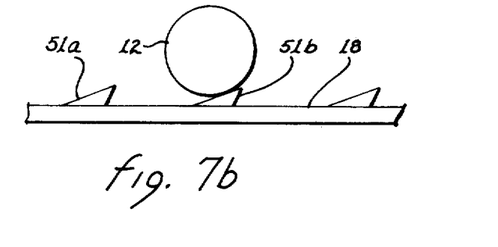

A variety of other modifications to the disclosed embodiment could be made by one of ordinary skill in the art without departing from the spirit and scope of my invention. For example, the movable pawls 20 which were described as integral to reciprocating plate 18 could be replaced with a plurality of fixed position wedges as shown in FIGS. 7a and 7b. In FIG. 7a, wheel 12 is being carried from the left toward the right by a wedge 51a connected to plate 18. As plate 18 moves toward the rear, and wheel 12 remains in its forward position, the orientation shown in FIG. 7b would occur. As can be seen, wheel 12 will ride up and over wedge 51b. As a result, movement of a vehicle by plate 18 will be a very bumpy operation. Wedges 51 need not be solid, but can be replaced by their functional equivalent of a flat element fixed in position at an angle corresponding to the upper surface of the wedge.

Figure 8A:
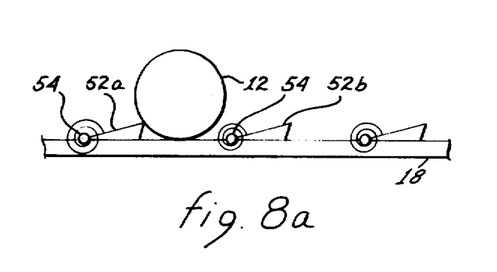
FIGS. 8a and 8b are a schematic representation of a second alternative embodiment of a conveyor in accordance with my invention.
Figure 8B:
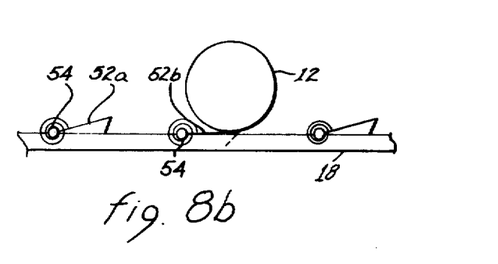

A second alternative is shown in FIGS. 8a and 8b. In FIG. 8a, plate 18 is moving from left to the right, while in FIG. 8b plate 18 is moving from the right to the left. As plate 18 moves in its forward stroke as shown in FIG. 8a, a spring loaded wedge 52a engages wheel 12 and carries it forward with plate 18. As plate 18 moves toward the rear, and wheel 12 remains in its forward position, wedge 52a moves out of engagement with wheel 12 and wedge 52b is forced into a retracted position by the downward pressure exerted against spring 54 by wheel 12.

Figure 9A:
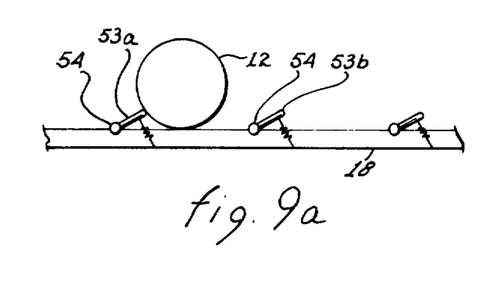
FIGS. 9a and 9b are a schematic representation of a third alternative embodiment of a conveyor in accordance with my invention.
Figure 9B:
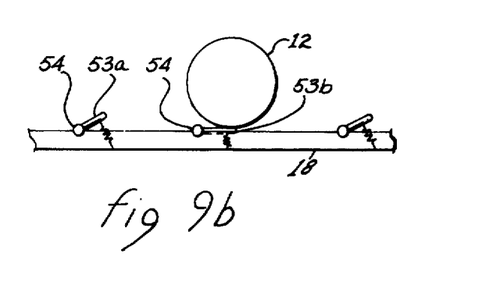

Another alternative is to replace the counterweighted pawls described in the illustrative embodiment with the spring loaded pawls 53 as shown in FIGS. 9a and 9b. FIG. 9a shows plate 18 moving from the left to the right and FIG. 9b shows plate 18 moving on its return stroke from the right to the left. As plate 18 moves forward, as shown in FIG. 9a, spring loaded pawl 53a engages wheel 12 and carries it forward with plate 18. As plate 18 moves toward the rear, pawl 53a moves out of engagement with wheel 12, while wheel 12 forces spring loaded pawl 53b into its retracted position. As soon as the retracting force is removed from pawl 53b, spring 54 will return the pawl to its full upright position.

Wedge 52 and pawl 53 are both examples of spring loaded elements having the functional equivalent of the counterweighted pawls 20 described in the illustrative embodiment; however, the gravity biased pawl 20 is preferred. Inclusion of the necessary springs 54 may increase the cost of manufacture and assembly of the reciprocating plate 18 and may provide a source of mechanical failure.

The springs 54 which serve to bias wedges 52 and pawls 53 are shown schematically in FIGS. 8 (a), 8 (b), 9 (a) and 9 (b) by circular indicia.

Although I have described my conveyor as operating in a car wash environment, it should be understood that this was done merely for purposes of illustration. The conveyor could be adapted for use in virtually any vehicle-moving environment. For example, the conveyor could readily move vehicles in an automated vehicle parking garage. Similarly, the conveyor could be uitlized even where the vehicle is only to be advanced the length of a single stroke. The multiple pawl drive apparatus would still permit easy placement of the vehicle on plate 18 prior to its advancement.

It should be clearly understood that the terms "forward" and "rearward" when used in the detailed description and in the claims are relative terms even though they have well defined meanings. For example, plate 18 reciprocates between precisely determined limits, defined as the fully forward position and the fully rearward position. By contrast, the forward position of a wheel or of vehicle 11 will not have such precisely defined limits. While vehicle 11 is carried forward with plate 18, upon the rearward motion of the plate 18, the vehicle will either remain fixed substantially at the limit of its advance, or it may continue moving forward due to its momentum or power from a second reciprocating plate. Also, the forward position of vehicle 11 will change with each reciprocation of plate 18 so that its forward position during one reciprocation becomes its rearward position during the subsequent reciprocation. Therefore, it can be seen that the forward and rearward positions of a wheel or a vehicle are relative and refer only to their positions during a particular reciprocation of plate 18.

I claim:

1. A method for longitudinally advancing a vehicle through a predetermined distance, said vehicle being carried by at least a first pair and a second pair of independently rotatable wheels, said method comprising the steps of:
   supporting one wheel in said first pair of independently rotatable wheels on a movable elongated plated while supporting the other wheel in said first pair of independently rotatable wheels on a stationary surface;
   longitudinally reciprocating said plate between a forward position and a rearward position, the length of said reciprocation being substantially less than said predetermined length;
   blocking the one wheel in said first pair of wheels to prevent both rotation of the one wheel and relative longitudinal movement between the one wheel and said plate as said plate moves toward its forward position;
   maintaining the forward advancement of the one wheel in said first pair of wheels while permitting the one wheel to both rotate and move longitudinally relative to said plate as said plate moves toward its rearward position; and
   repeating the foregoing steps to incrementally advance said vehicle through said predetermined distance.

2. The method of claim 1 including the steps of:
   supporting one wheel in said second pair of independently rotatable wheels on said reciprocating plate, while supporting the other wheel in said second pair of independently rotatable wheels on said stationary surface;
   blocking the one wheel in said second set of wheels to prevent both rotation of the one wheel and relative longitudinal movement between the one wheel and said plate as said plate moves toward its forward position; and
   maintaining the forward advancement of the one wheel in said second set of wheels while permitting the one wheel to both rotate and move longitudinally relative to said plate as said plate moves toward its rearward position.

3. The method of claim 2 wherein the step of blocking the one wheel in said first pair of wheels is intermittently performed as said vehicle is advanced through said predetermined distance.

4. The method of claim 3 wherein the step of blocking the one wheel in said second pair of wheels is intermittently performed as said vehicle is advanced through said predetermined distance.

5. The method of claim 1 including the step of:
   advancing the one wheel in said first pair of independently rotatable wheels off said elongated plate.

6. The method of claim 2, including the steps of:
   advancing the one wheel in said first pair of independently rotatable wheels off said elongated plate; and
   advancing the one wheel in said second pair of independently rotatable wheels off said elongated plate.

7. The method of claim 1 wherein said plate is reciprocated at a first rate in the forward direction and at a second rate in the rearward direction.

8. The method of claim 7 wherein said second rate exceeds said first rate.

9. The method of claim 4 wherein said plate is reciprocated at a first rate in the forward direction and at a second rate in the rearward direction, said second rate being greater than said first rate.

10. The method of claim 9 including the steps of:
    advancing the one wheel in said first pair of independently rotatable wheels off said elongated plate; and
    advancing the one wheel in said second pair of independently rotatable wheels of said elongated plate.

11. In combination an apparatus for longitudinally conveying a vehicle though a predetermined distance, and a vehicle carried by at least a first pair and a second pair of independently rotatable wheels, the improvement comprising in combination:
    a. a movable elongated plate for supporting one wheel in said first pair of independently rotatable wheels;
    b. a stationary surface for supporting the other wheel in said first pair of independently rotatable wheels;

c. power means for longitudinally reciprocating said plate between a forward position and a rearward position, the length of said reciprocation being substantially less than said predetermined distance;
d. means for blocking the one wheel in said first pair of wheels to prevent both rotation of the one wheel and relative longitudinal movement between the one wheel and said plate as said plate moves toward its forward position; and,
e. means for maintaining the forward advancement of the one wheel in said first pair of wheels while permitting the one wheel to both rotate and move longitudinally relative to said plate as said plate moves towards its rearward position;

whereby said vehicle is incrementally advanced through said predetermined distance.

12. The apparatus of claim 11 wherein said power means drives said plate from the rearward position to the forward position at a first rate and drives said plate from the forward position to the rearward position at a second rate, said second rate being greater than said first rate.

13. The apparatus of claim 11 wherein said means for blocking comprises
a plurality of gravity biased pawls pivotally mounted in serial arrangement along the length of said elongated plate.

14. The apparatus of claim 11 wherein said means for blocking comprises
a plurality of spring biased elements pivotally mounted in serial arrangement along the length of said elongated plate.

15. The apparatus of claim 11 wherein said means for blocking comprises
a plurality of fixed elements mounted in spaced, serial arrangement along the length of said elongated plate, each of said fixed elements having an upper surface which tapers away from said elongated plate in the direction of forward reciprocation.

16. The apparatus of claim 12 wherein said means for blocking comprises
a plurality of gravity biased pawls pivotally mounted in serial arrangement along the length of said elongated plate.

* * * * *